J. R. McCONNELL.
Wheel-Plows.
No. 149,140.
Patented March 31, 1874.
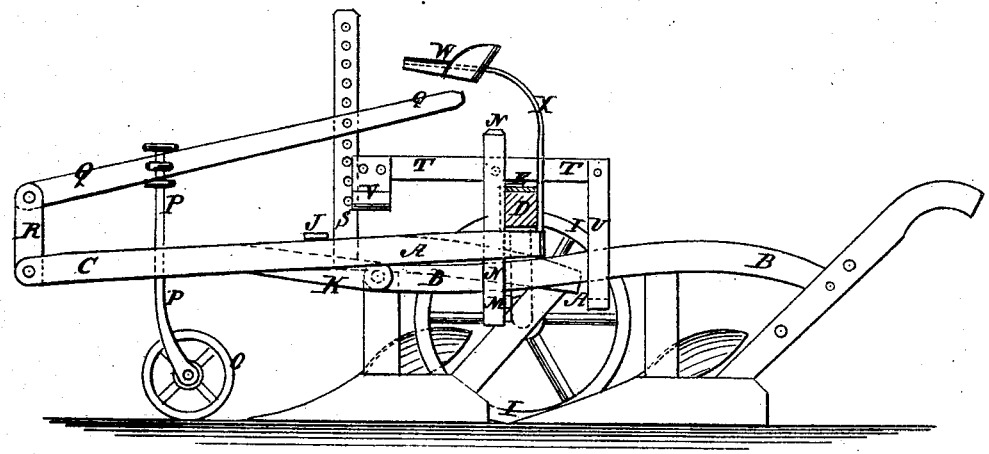
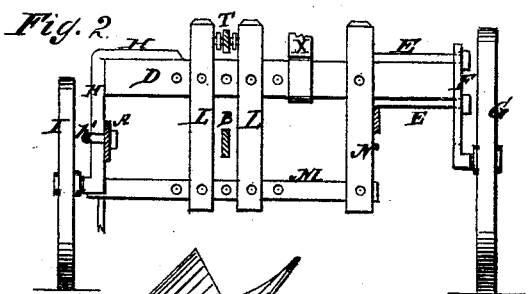
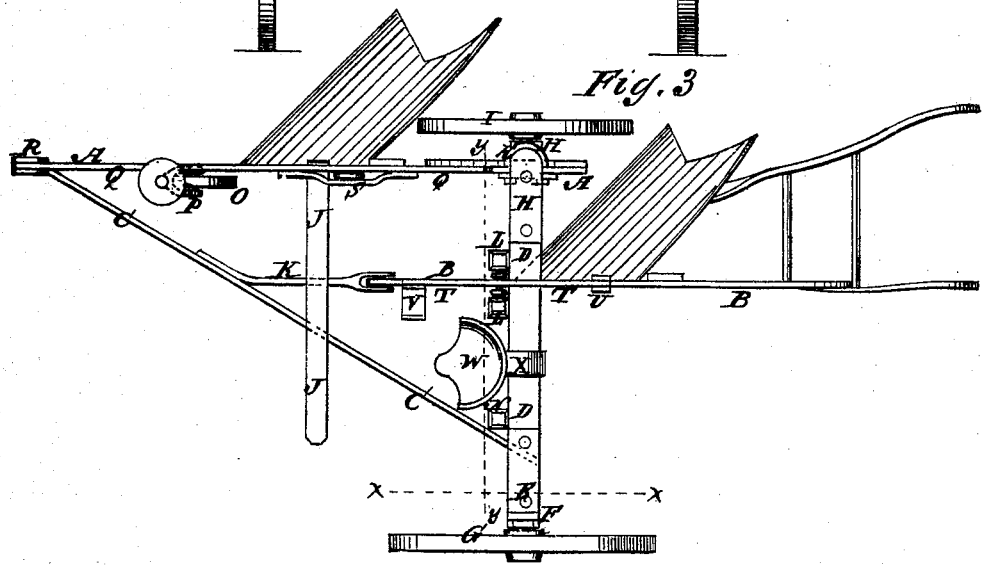
Witnesses:
E. Wolff.
Inventor:
J. R. McConnell
Per
Attorneys.

UNITED STATES PATENT OFFICE.

JOHN R. McCONNELL, OF WATERLOO, IOWA.

IMPROVEMENT IN WHEEL-PLOWS.

Specification forming part of Letters Patent No. 149,140, dated March 31, 1874; application filed August 9, 1873.

*To all whom it may concern:*

Be it known that I, JOHN R. MCCONNELL, of Waterloo, in the county of Black Hawk and State of Iowa, have invented a new and useful Improvement in Wheel-Plows, of which the following is a specification:

Figure 1 is a side view of my improved machine, partly in section, through the line $x\,x$, Fig. 3. Fig. 2 is a vertical cross-section of the same, taken through the line $y\,y$, Fig. 3. Fig. 3 is a top view of the same.

Similar letters of reference indicate corresponding parts.

My invention relates to the construction and arrangement of parts, as indicated in the claims, and hereinafter described in connection with others necessary to form a complete or operative machine.

A is the forward and B is the rear plow-beam. To the forward end of the forward plow-beam A is secured the forward end of the inclined or brace beam C, the rear end of which is secured to the axle D, near its land-side end. To the upper and lower sides of the land-side end of the axle D are attached straps, plates, or bars E, the outer ends of which are made small, to pass through the slot in the vertical part of the bent axle-arm F, and have screw-threads cut upon them to receive the nuts by which said axle-arm is secured in place, so that by loosening the said nuts the bent axle-arm F may be moved up and down to adjust the machine to run level. G is the land-side wheel, which revolves upon the journal of the axle-arm F. To the other or plowed-land end of the axle D is rigidly attached a bent axle-arm, H, upon the journal of which the furrow-wheel I revolves. The wheel I is made small, being about two-thirds the diameter of the other wheel. The rear end of the forward plow-beam, at about the point where the handle is attached, is secured to the axle-arm H by an eyebolt or staple, $h'$, which passes around said axle-arm, and is secured to the said beam. By this arrangement the wheel I will work between the rear part of the mold-board and the land-side of the plow, and its lower side should project about one-quarter of an inch below the base of the plow, so as to support the downward pressure of the plow, and thus diminish the friction, and consequently the draft. J is a cross-bar attached to the forward plow-beam A and the inclined brace-beam C, to strengthen the connection between said beams, and which also serves as a rest for the driver's feet. The forward end of the rear plow-beam B is pivoted to the rear end of the bar K, the forward end of which is securely attached to the inclined brace-beam C. The draft-bar K and beam B are made of such a length that the furrow may be turned by the rear plow just in the rear of the furrow-wheel I. L are two upright bars, placed at such a distance apart that the beam B may pass and work freely between them. The upper ends of the bars L are bolted to the axle D, and their lower ends are bolted to the cross-bar M, several holes being formed in said axle D and bar M, to receive the said bolts, so that the rear plow may be readily adjusted to take more or less land, as may be desired. One end of the bar M is attached to the standard or handle of the forward plow, and its other end is attached to the lower end of the upright bar N, the upper end of which is secured to the axle D. The forward end of the machine is supported by a caster-wheel, O, the standard P of which passes up through a socket attached to the forward plow-beam A, and its upper end is swiveled to a lever, Q. The forward end of the lever Q is connected with the forward ends of the plow-beam A and inclined brace-beam C by a bar or link connection, R. The rear end of the lever Q extends back into such a position that it may be conveniently reached and operated by the driver from his seat. To the lever Q, near its rear end, is attached a keeper, to receive the bar S, the lower end of which is attached to the plow-beam A, and which has a number of holes formed in it to receive a pin for securing and supporting the lever Q in any position into which it may be adjusted. By this construction, by operating the lever Q, the plows may be raised from the ground, or adjusted to work at any desired depth in the ground. T is a lever pivoted to and between the upper ends of the upright bars L, and to the rear end of which is attached a loop, U, through which passes the rear plow-beam B. The forward end of the lever T has a foot-rest, V, formed upon or attached to it, so that it may be operated by the driver with his foot, to raise the rear plow from the ground. W is the driver's seat, the spring-standard X of which is attached to the axle D.

Having thus described my invention, I claim as new and desire to secure by Letters Patent—

1. In combination with the slotted adjustable axle-arm F and rigid arm H, carrying the wheels G I, the triangular frame formed of the front plow-beam A, the diagonal bar C, carrying the draft-bar K, and axle D, all constructed and arranged as shown and described, for the purpose specified.

2. The combination of the rear plow-beam B, lever T U, draft-bar K, vertical guide-bars L, to adjust laterally both plow-beam and lever, axle D, and bar M, all constructed and arranged as shown and described.

JOHN R. McCONNELL.

Witnesses:
J. P. BRUSH,
L. W. COOKE.